(12) United States Patent
Persson (10) Patent No.: US 12,474,127 B2
(45) Date of Patent: Nov. 18, 2025

(54) THERMAL ENERGY STORAGE SYSTEM

(71) Applicant: ENERGYINTEL SERVICES LTD, Nicosia (CY)

(72) Inventor: Daniel Persson, Amal (SE)

(73) Assignee: ENERGYINTEL SERVICES LTD., Nicosia (CY)

( * ) Notice: Subject to any disclaimer, the term of this patent is extended or adjusted under 35 U.S.C. 154(b) by 71 days.

(21) Appl. No.: 18/576,485

(22) PCT Filed: Jun. 14, 2022

(86) PCT No.: PCT/SE2022/050585
§ 371 (c)(1),
(2) Date: Jan. 4, 2024

(87) PCT Pub. No.: WO2023/282816
PCT Pub. Date: Jan. 12, 2023

(65) Prior Publication Data
US 2024/0310129 A1    Sep. 19, 2024

(30) Foreign Application Priority Data
Jul. 8, 2021    (SE) .................................... 2150911-2

(51) Int. Cl.
*F28D 20/02*    (2006.01)
*F04D 7/06*    (2006.01)

(52) U.S. Cl.
CPC ........... *F28D 20/021* (2013.01); *F04D 7/065* (2013.01); *F28D 20/028* (2013.01); *Y02E 60/14* (2013.01)

(58) Field of Classification Search
CPC ....... Y02E 60/14; F28D 20/02; F28D 20/021; F28D 20/028; F04D 7/065
See application file for complete search history.

(56) References Cited

U.S. PATENT DOCUMENTS

| 4,029,123 A | 6/1977 | George et al. |
| 4,233,960 A | 11/1980 | Johnson |

FOREIGN PATENT DOCUMENTS

| JP | 58150094 A | 9/1983 |
| JP | 5939993 A | 3/1984 |

(Continued)

OTHER PUBLICATIONS

Int'l Search Report for PCT/SE2022/050585, dated Aug. 2, 2022.

*Primary Examiner* — Eric S Ruppert
(74) *Attorney, Agent, or Firm* — MaxGoLaw PLLC (57) ABSTRACT

A thermal energy storage is provided that includes a first container for a phase change material and a jacket connected to the first container. A space is formed between the jacket and the first container, a heating chamber is provided that includes a heating device, the heating chamber being in fluid communication with the jacket, a second container for a heat transfer fluid, a pump arrangement for pumping the heat transfer fluid from the second container, via the heating chamber, and to the said space formed between the jacket and the first container, in order to cause thermal energy to be transferred between the heat transfer fluid and the phase change material. The heating chamber has a projecting portion that extends through a wall of the second container such that a connecting interface between the pump arrangement and the heating chamber is located inside the second container. If any heat transfer fluid leaks through the connecting interface it remains in the second container.

6 Claims, 7 Drawing Sheets

(56) References Cited

FOREIGN PATENT DOCUMENTS

| | | | |
|---|---|---|---|
| JP | 60183298 | U | 12/1985 |
| JP | 6143293 | A | 3/1986 |
| SE | 1950569 | A1 | 11/2020 |
| WO | 2020091673 | A1 | 5/2020 |

THERMAL ENERGY STORAGE SYSTEM

TECHNICAL FIELD

The present disclosure relates to a thermal energy storage system. In particular, it relates to a thermal energy storage system in which thermal energy is transferred between a heat transfer fluid and a phase change material.

BACKGROUND ART

A thermal energy storage system may be used for converting thermal energy to electricity. A phase change material may be heated and liquefied in a container. The phase change, from solid state to liquid state, results in a large energy recovery. The temperature at which the phase change material is liquefied may, e.g. be just under 600° C. Examples of suitable phase change materials are different aluminium alloys.

A heat transfer fluid may be used to heat the phase change material. By passing the heat transfer fluid along the container a thermal energy transfer between the heat transfer fluid and the phase change material occurs. An example of a heat transfer fluid may be sodium (Na), which is in liquid state at a temperature above 98° C. It is well known that sodium can react in a non-controlled environment. The heated sodium may start to burn heavily if it leaks and reacts with oxygen in air. It is therefore of great importance, when transferring sodium from one location to another, that this is done without risking any leakage of sodium to the surroundings. For instance, if the sodium is contained in one container and is to be lead to the phase change material container, this must be done in as secure way as possible.

Thus, any fluid connection necessary between different parts of a system should be appropriately sealed. Nevertheless, there may always be risks of leakage, such as due to incorrectly aligned connections, material fatigue, or seals deteriorating over time. It would therefore be desirable to provide a thermal energy storage system which further reduces the risk of the heat transfer fluid leaking to the surroundings.

SUMMARY OF THE INVENTION

In view of the explanations given above, it should be understood that an object of the present disclosure is to provide a thermal energy storage system which at least partly alleviates the drawbacks of the prior art. This and other objects, which will become apparent in the following discussion, are achieved by a thermal energy storage system according to the accompanying claim 1. Exemplary embodiments are presented in the dependent claims.

Although the background section of the present disclosure specifically discussed sodium as being hazardous if there is a leakage, it should be understood that the present general inventive concept is applicable to any suitable heat transfer fluid (HTF), and is thus by no means limited to sodium.

The present inventive concept is based on the insight that by providing a fluid connection between two parts in a sodium-safe environment, any leakage that may occur at the connection will remain in the sodium-safe environment. In particular, the inventor has realized that a pump arrangement used for pumping the heat transfer fluid (HTF) from a HTF-container may suitably be connected to another part of the system in order to form an interface in a flow passage for the HTF, said interface being arranged within the actual container. Thus, any inadvertent leakage of HTF occurring at the interface will remain in the HTF-container.

According to an aspect of the present disclosure, there is provided a thermal energy storage system, comprising:
- a first container for containing a phase change material,
- a jacket connected to the exterior of the first container, wherein a space is formed between the jacket and a wall portion of the first container, the jacket having an inlet,
- a heating chamber comprising a heating device, the heating chamber being in fluid communication with the inlet of the jacket,
- a second container for containing a heat transfer fluid,
- a pump arrangement provided in the second container for pumping the heat transfer fluid from the second container, via the heating chamber in which the heat transfer fluid is heated by the heating device, and to the said space formed between the jacket and the wall portion of the first container, in order to cause thermal energy to be transferred between the heat transfer fluid and the phase change material via said wall portion of the first container,
- wherein the heating chamber has a projecting portion that extends through a wall of the second container such that a connecting interface between the pump arrangement and the heating chamber is located inside the second container, wherein if any heat transfer fluid leaks through the connecting interface it will remain in the second container.

As already understood from above, by having a connecting interface between the pump arrangement and the heating chamber inside the second container, the risk of HTF exposure outside the system is greatly reduced, because even if there would be a leakage at the interface, the HTF would leak to the second container, i.e. the HTF container. This is clearly advantageous compared to having said connecting interface outside of the HTF container, in which case if leakage occurs the HTF would leak to the surroundings.

The phase change material (PCM) used in the thermal energy storage system may suitably be an aluminium alloy, however, the general inventive concept is not limited to a specific PCM, and is applicable in connection with any suitable PCM.

The jacket connected to the exterior of the first container may suitably be connected to the bottom of the first container, thus said space being formed underneath the first container. The jacket may also be referred to as a charging jacket since the PCM turns into liquid phase when subjected to the heat from the HTF in the jacket. Thus, the thermal energy storage system is charged with energy. During energy discharge, heat may be transferred from the PCM through another HTF-circuit (whereby the PCM will shift back to solid phase) to energize a device. For instance, the heat from said other HTF-circuit may be used to heat a working gas to run a Stirling engine. It should be understood that the thermal energy storage system, may be used in other implementations as well where it is desired to store thermal energy.

According to at least one exemplary embodiment, the connecting interface between the pump arrangement and the heating chamber includes a pump arrangement opening and a heating chamber opening, wherein said openings share a common geometrical axis, wherein the pump arrangement is configured to be mounted into the second container along said common geometrical axis such that, as the pump arrangement is inserted into the second container, the openings will be aligned to form said connecting interface. This is advantageous as it facilitates the mounting procedure. The insertion of the pump arrangement into the second container, and the connection of the pump arrangement to the heating chamber may thus be accomplished in a common motion. Suitably, the pump arrangement is mounted to the second container by a vertical motion, in which the pump arrangement is lowered into the second container. During such a lowering motion the pump arrangement opening will approach the heating chamber opening. It should be understood that the heating chamber opening is provided in the projecting portion of the heating chamber, i.e. the projecting portion which extends through the wall of the second container. The projecting portion may suitably be welded to the wall of the second container.

According to at least one exemplary embodiment, the pump arrangement comprises a nozzle, a part of which is configured to be inserted into the projecting portion of the heating chamber, the system further comprising a deformable metal bellow, which encircles a part of the nozzle that is located outside of the heating chamber, wherein the deformable metal bellow is configured to take up tolerances between the nozzle and the projecting portion of the heating chamber when the pump nozzle is connected to the projecting portion of the heating chamber during assembling. This is advantageous as it facilitates manufacturing and mounting. It may generally be difficult to cater for tolerances when two components are to be connected during assembling. The deformable metal bellow provides a forgiving solution to any tolerances that may be present between the nozzle and the mating projecting portion of the heating chamber. Thus, during mounting the metal bellow will be deformed as needed to take up any such tolerances.

According to at least one exemplary embodiment, the thermal energy storage system further comprises a sealing ring for sealing said connecting interface, which sealing ring encircles a part of the nozzle that is located outside of the heating chamber, wherein, during assembling of the pump arrangement to the second container, the bellow is configured to become pressed and deformed against the sealing ring.

This exemplary embodiment is advantageous since the metal bellow has dual functionality.

Thus, in addition to being configured to take up tolerances, it may be used for improving the seal at the connecting interface.

According to at least one exemplary embodiment, the pump arrangement has a predefined rotational orientation relative to the second container, wherein the system comprises guide elements for guiding the pump arrangement such that when the pump arrangement is mounted into the second container it obtains said predefined rotational orientation. This is advantageous as it facilitates the assembling of the system. Suitably, said predefined rotational orientation is such that the mating parts of the pump arrangement and the heating chamber are aligned along a common geometrical interface axis.

According to at least one exemplary embodiment, the thermal energy storage system comprises tightening elements configured to cooperate with said guide elements for fixating the pump arrangement to the second container when the pump arrangement has been inserted into the second container. This is advantageous as the guide elements may have dual functionality. When the guide elements have guided the pump arrangement into the correct place, they may receive the tightening elements to firmly keep the pump arrangement in place. Each guide element may suitably comprise a threaded shaft which can receive a mating female tightening element, such as a nut.

Generally, all terms used in the claims are to be interpreted according to their ordinary meaning in the technical field, unless explicitly defined otherwise herein. All references to "a/an/the element, device, component, means, etc." are to be interpreted openly as referring to at least one instance of the element, device, component, means, etc., unless explicitly stated otherwise. Further features and advantages of the present invention will become apparent when studying the appended claims and the following description. The skilled person realizes that different features of the present invention may be combined to create embodiments other than those described in the following, without departing from the scope of the present invention.

DETAILED DESCRIPTION

Figure 1:
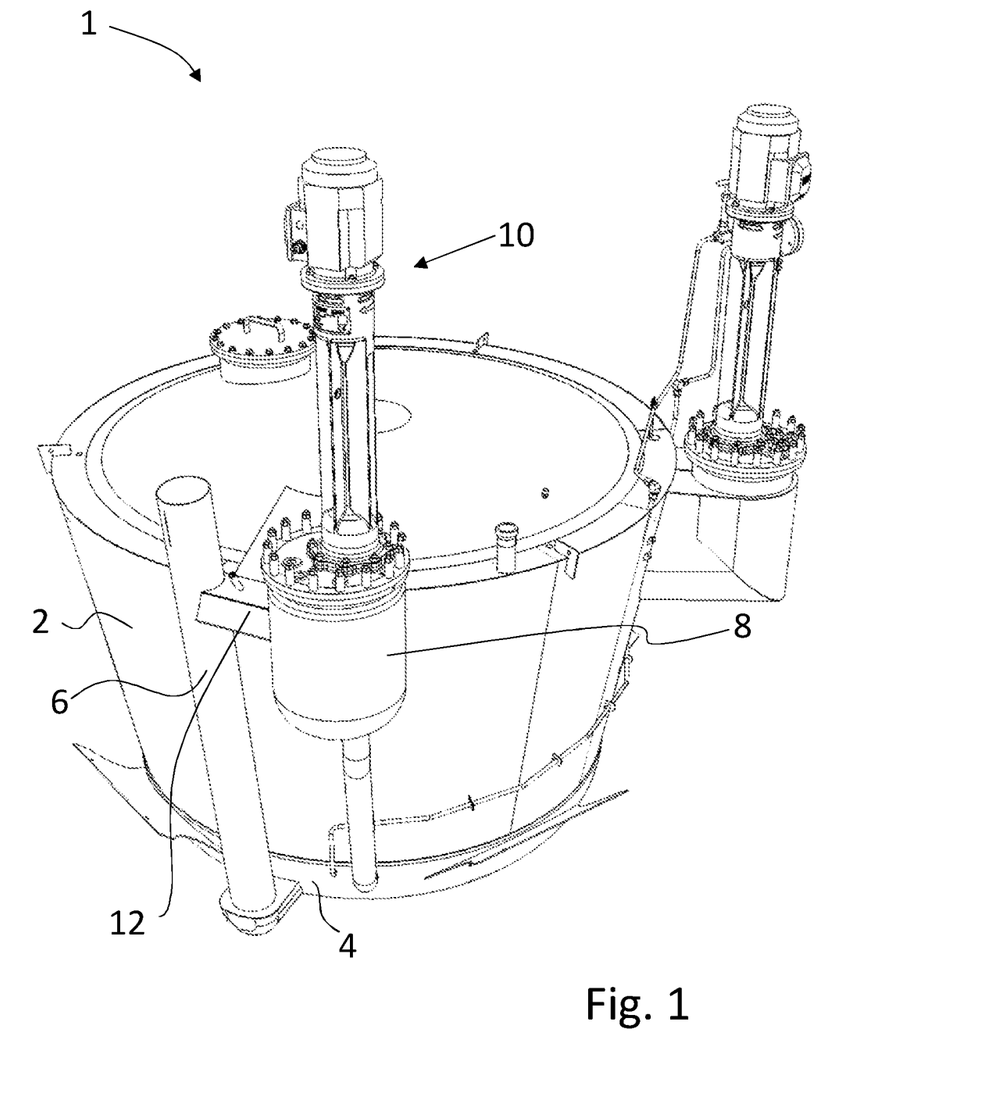
FIG. 1 illustrates a thermal energy storage system according to at least one exemplary embodiment.

FIG. 1 illustrates a thermal energy storage system 1 according to at least one exemplary embodiment. The thermal energy storage system 1 comprises a first container 2 for containing a phase change material, such as an aluminium material. The first container 2 may have a relatively large size. A jacket 4 is connected to the exterior of the first container 2, wherein a space is formed between the jacket 4 and a wall portion of the first container 2. As illustrated in FIG. 1 the jacket 4 is suitably located at the bottom of the first container 2, and may thus form the space together with a bottom wall portion of the first container 2.

The thermal energy storage system 1 further comprises a heating chamber 6, which comprises a heating device. The heating chamber 6 is in fluid communication with an inlet of the jacket 4. The thermal energy storage system 1 further comprises a second container 8 and a pump arrangement 10 provided in the second container 8. The second container 8 may have a relatively small size. The second container 8 is configured to contain a heat transfer fluid, such as liquid sodium. The pump arrangement 10 is configured to pump the heat transfer fluid from the second container 8, via the heating chamber 6, to the space formed between the jacket 4 and the wall portion of the first container 2. When passing through the heating chamber 6 the heat transfer fluid will become heated by the heating device. Thermal energy is transferred between the heat transfer fluid located in said space and the phase change material. More specifically, thermal energy is transferred from the heat transfer fluid to the phase change material via said wall portion of the first container 2.

The jacket 4 has an outlet, from which heat transfer fluid, is pumped back into the second container 8. Thus, the pump arrangement 10 moves the heat transfer fluid in a closed circuit.

Because of the transfer of heat energy, the phase change material will melt and turn into liquid phase. This phase change charges the system 1 with energy, which may be discharged at a later point in time. The energy may be discharged by making use of another heat transfer fluid circuit to take up the thermal energy from the phase change material (which then shifts back to solid form). The discharge of energy and the various possible implementations of the discharged energy do not form part of the general inventive concept as such. However, it should be understood that the thermal energy storage system 1 of the present invention may be used in any suitable implementation as will be appreciated by the person skilled in the art. One such example is to energize a sterling motor.

As can be seen in FIG. 1, the heating chamber 6 has a projecting portion 12. As can be seen more clearly in FIG. 2 (which shows a partly cross-sectional detailed view) the projecting portion 12 extends through a wall 14 of the second container 8 such that a connecting interface 16 between the pump arrangement 10 and the heating chamber 6 is located inside the second container 8, wherein if any heat transfer fluid leaks through the connecting interface 16 it will remain in the second container 8.

Figure 3:
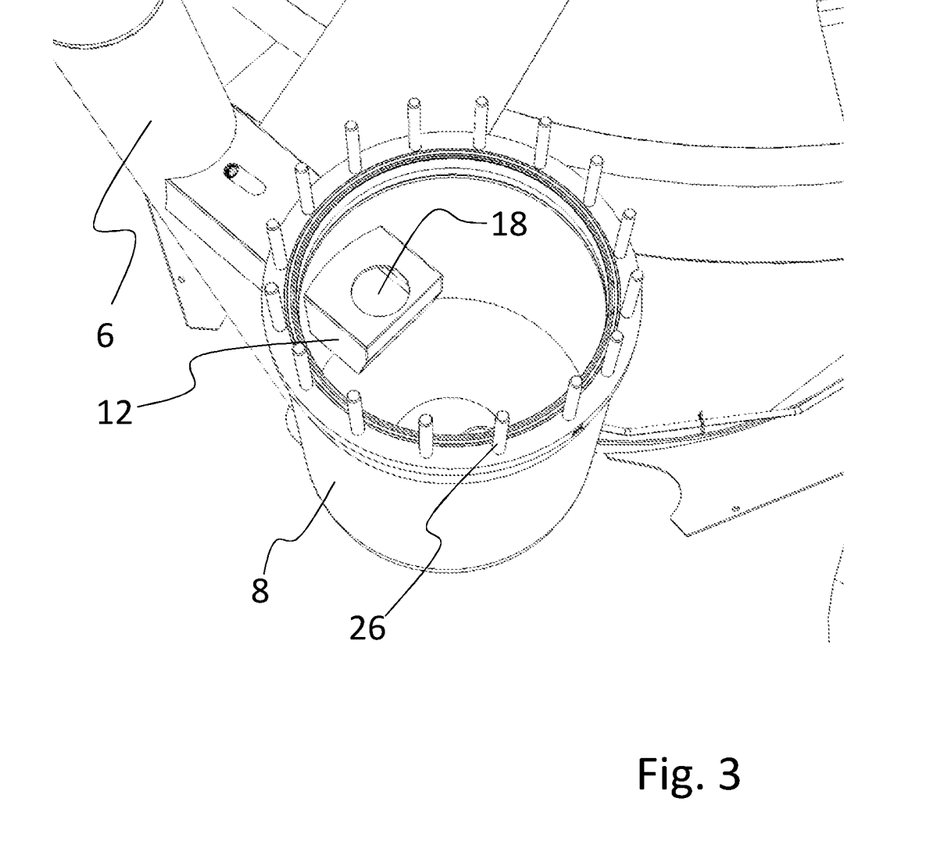
Figure 4:
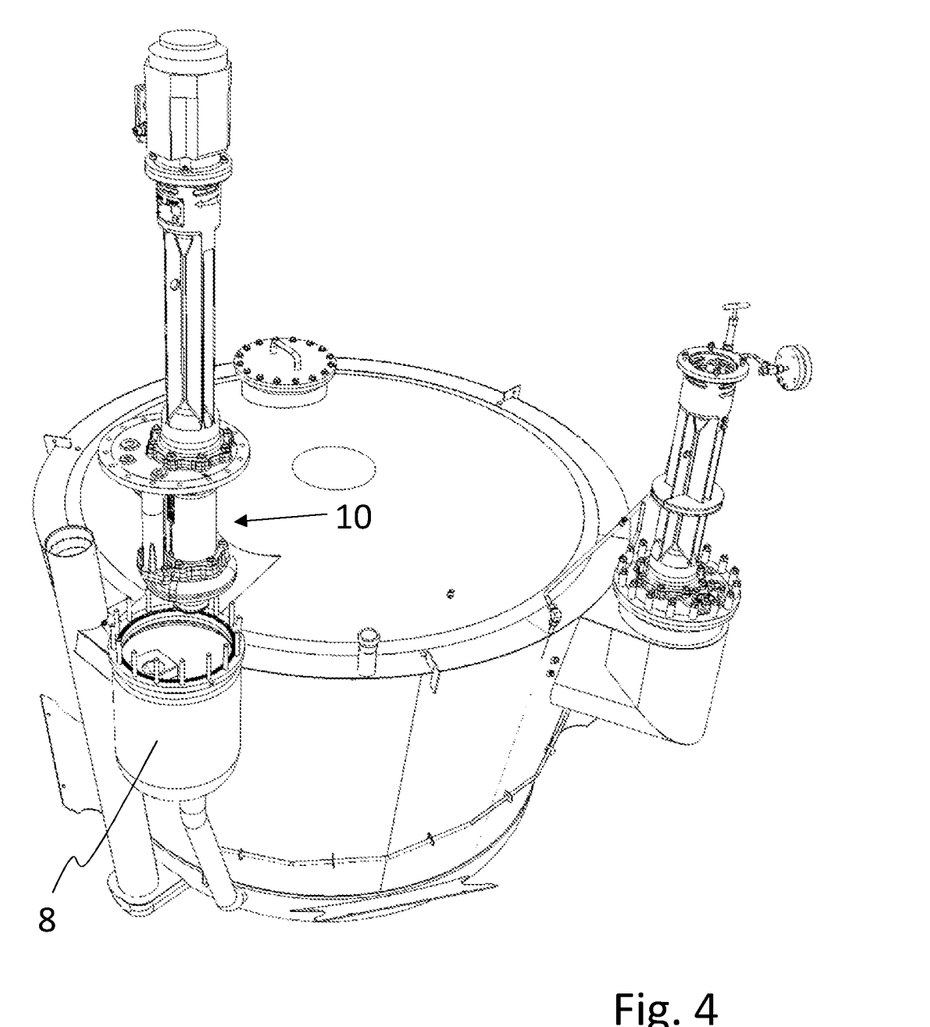
FIG. 4 illustrates the thermal energy storage system before being fully assembled.
Figure 5:
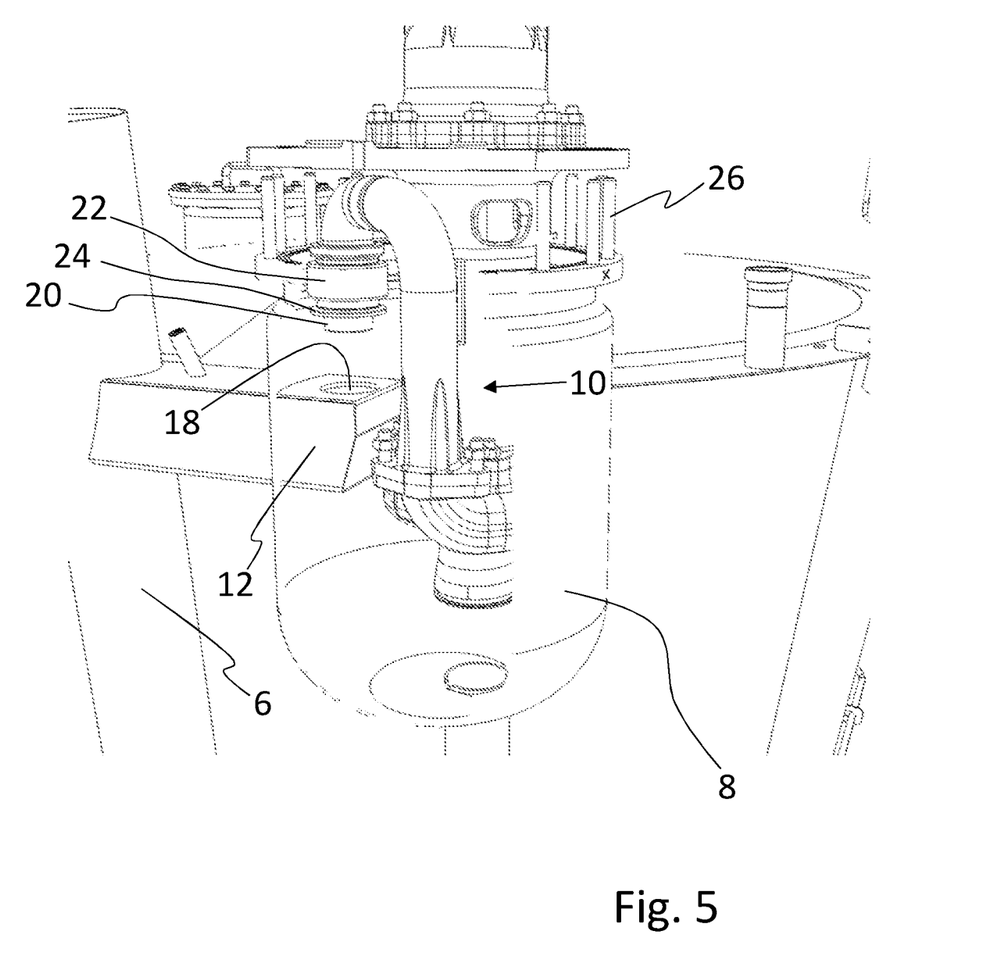
Figure 6:
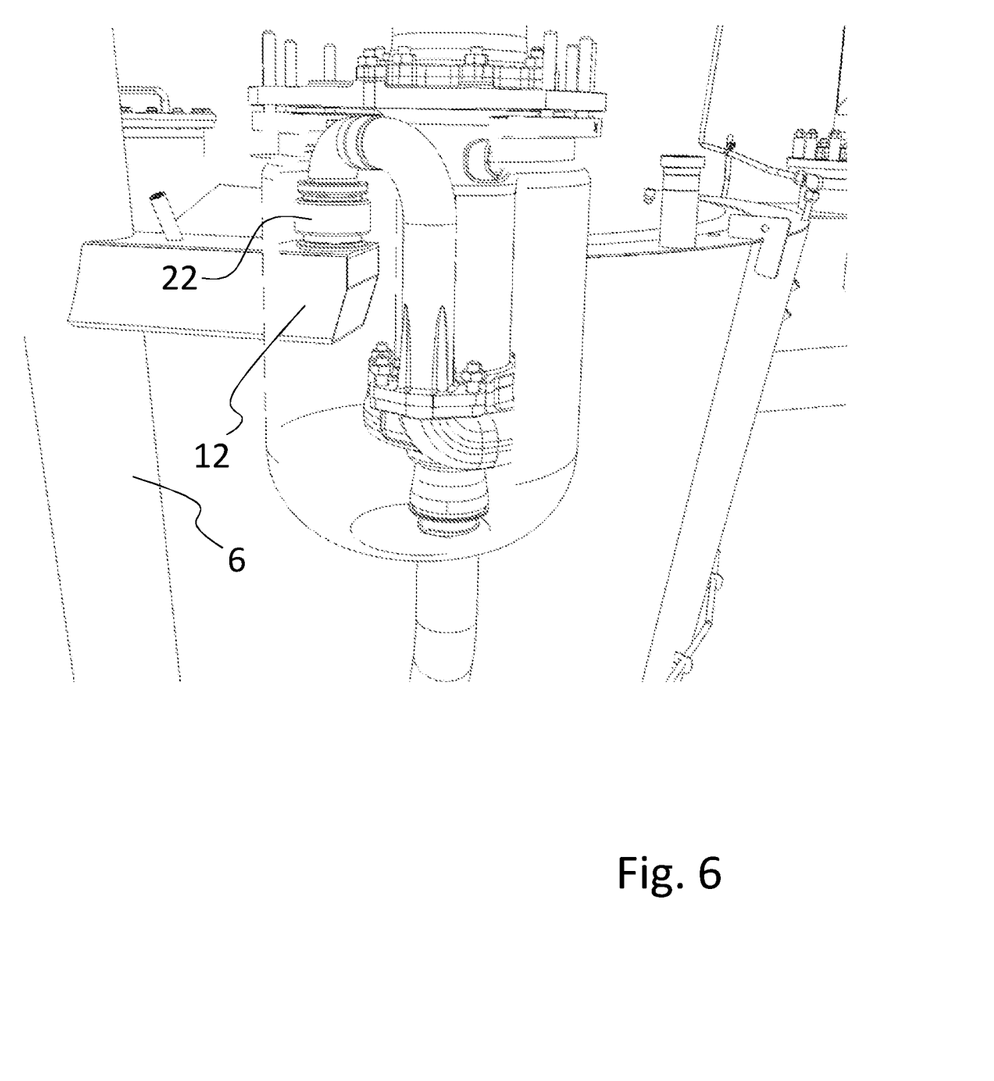
Figure 7:
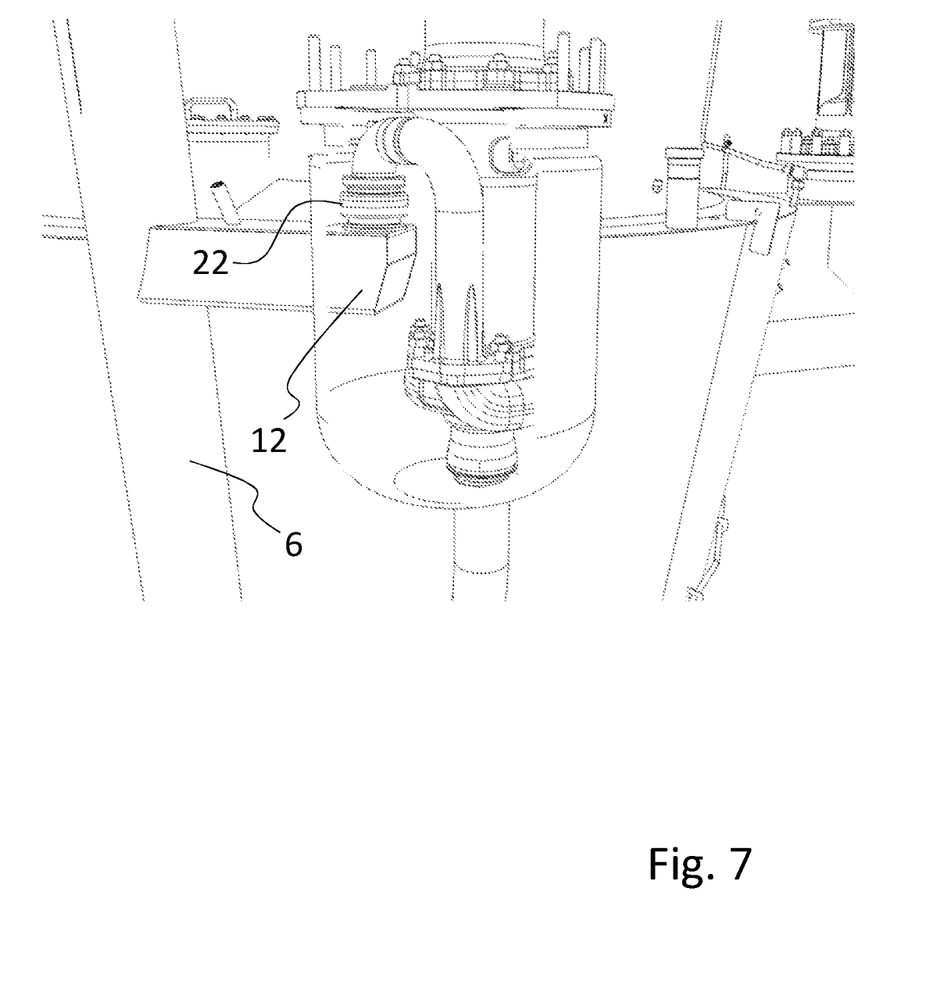

As can be seen in FIG. 3 which shows the second container 8 from above without the pump arrangement, the heating chamber 6 has a heating chamber opening 18. More specifically, the projecting portion 12 of the heating chamber 6 has said heating chamber opening 18. Correspondingly, the pump arrangement has a pump arrangement opening. Thus, the connecting interface between the pump arrangement and the heating chamber includes the pump arrangement opening and the heating chamber opening 18. Said openings share a common geometrical axis, wherein the pump arrangement is configured to be mounted into the second container 8 along said common geometrical axis such that, as the pump arrangement is inserted into the second container, the openings will be aligned to form said connecting interface. This is illustrated in FIGS. 4-7. More specifically, FIG. 4 illustrates the pump arrangement 10 located above the second container 8, before it is lowered/inserted into the second container 8. FIGS. 5-7 shows a sequence as the pump arrangement 10 is inserted into the second container 8 wherein a nozzle 20 of the pump arrangement 10 approaches and mates with the heating chamber opening. The pump chamber opening is provided in the nozzle 20.

With reference to FIGS. 6-7, a part of the nozzle has been inserted into the projecting portion 12 of the heating chamber 6. A deformable metal bellow 22 encircles a part of the nozzle that is located outside of the heating chamber 6 (i.e. outside of the projecting portion 12 of the heating chamber 6). The deformable metal bellow 22 is configured to take up tolerances between the nozzle and the projecting portion 12 of the heating chamber 6 when the pump nozzle is connected to the projecting portion 12 of the heating chamber during assembling. This is illustrated in FIGS. 6 and 7, wherein in FIG. 7 the bellow 22 has become deformed compared to FIG. 6.

As best seen in FIG. 5, the thermal energy storage system may suitably comprise a sealing ring 24 for sea ling said connecting interface 22. The sealing ring 24 encircles a part of the nozzle that is intended to be located outside of the projecting portion 12 of the heating chamber 6. As illustrated in FIG. 5, the sealing ring 24 may be located underneath the deformable metal bellow 22. During assembling of the pump arrangement 10 to the second container 8, the bellow 22 is configured to become pressed and deformed against the sealing ring 24.

The pump arrangement 10 may have a predefined rotational orientation relative to the second container 8, wherein the thermal energy storage system comprises guide elements 26 for guiding the pump arrangement 10 such that when the pump arrangement 10 is mounted into the second container 8 it obtains said predefined rotational orientation.

Figure 2:
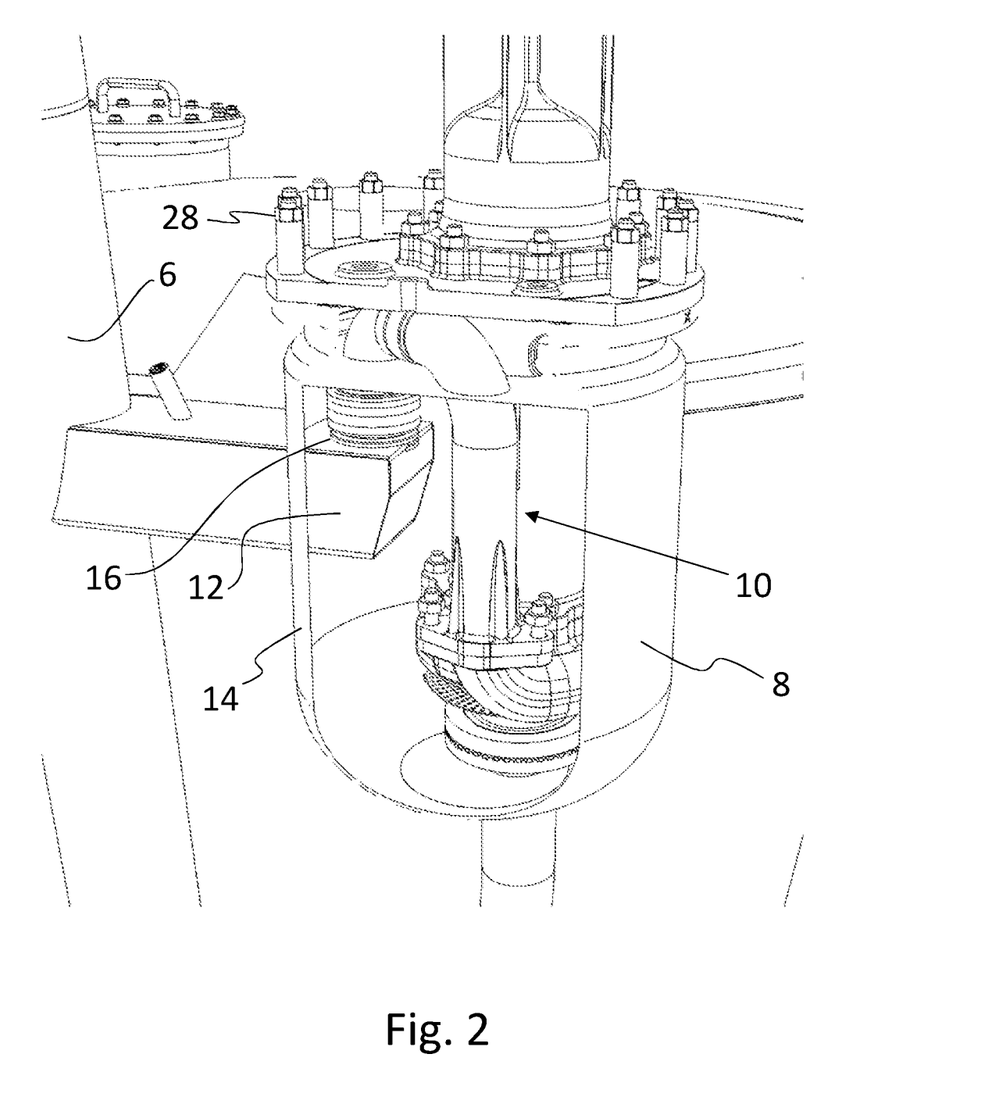
FIGS. 2, 3, 5, 6 and 7 disclose details of the exemplary embodiment of FIG. 1.

The guide elements 26 may suitably project upwardly from the second container 8, such as from an upper end face of the second container 8. This can, for instance, be seen in FIG. 3. The guide elements 26 may suitable be configured to extend through holes in the pump arrangement 10 for guiding the pump arrangement 10, for example through holes in a flange of the pump arrangement 10. As best seen in FIG. 2, the thermal energy storage system may further comprise tightening elements 28 configured to cooperate with said guide elements for fixating the pump arrangement 10 to the second container 8 when the pump arrangement 10 has been inserted into the second container 8. The tightening elements 28 may suitably have female threads (e.g. the tightening elements may be in the form of nuts or end caps) engaging with respective male threaded portions of the guide elements.

From the above disclosure it should now be understood that the illustrated exemplary embodiment, provides for a secure manner of handling a heat transfer fluid in an thermal energy storage system. In particular, in the event that leakage should inadvertently occur at the junction between the pump arrangement 10 and the heating chamber 6, i.e. at the connecting interface 16, any such leakage will remain in the closed heat transfer fluid circuit since such leakage will drop into the volume defined by the wall 14 of the second container 8.

The invention claimed is:

1. A thermal energy storage system (1) comprising:
a first container (2) for containing a phase change material,
a jacket (4) connected to an exterior of the first container, wherein a space is formed between the jacket and a wall portion of the first container, the jacket having an inlet,
a heating chamber (6) comprising a heating device, the heating chamber being in fluid communication with the inlet of the jacket,
a second container (8) for containing a heat transfer fluid,
a pump arrangement (10) provided in the second container for pumping the heat transfer fluid from the second container, via the heating chamber in which the heat transfer fluid is heated by the heating device, and to the said space formed between the jacket and the wall portion of the first container, in order to cause thermal energy to be transferred between the heat transfer fluid and the phase change material via said wall portion of the first container,
wherein the heating chamber has a projecting portion (12) that extends through a wall (14) of the second container such that a connecting interface (16) between the pump arrangement and the heating chamber is located inside the second container, wherein if any heat transfer fluid leaks through the connecting interface it will remain in the second container.

2. The thermal energy storage system (1) according to claim 1, wherein the connecting interface (16) between the pump arrangement (10) and the heating chamber (6) includes a pump arrangement opening and a heating chamber opening (18), wherein said openings share a common geometrical axis, wherein the pump arrangement is configured to be mounted into the second container (8) along said common geometrical axis such that, as the pump arrangement is inserted into the second container, the openings align to form said connecting interface.

3. The thermal energy storage system (1) according to claim 1, wherein the pump arrangement (10) comprises a nozzle (20), a part of the nozzle is configured to be inserted into the projecting portion (12) of the heating chamber (6), the system further comprising a deformable metal bellow that encircles a part of the nozzle that is located outside of the heating chamber, wherein the deformable metal bellow is configured to take up tolerances between the nozzle and the projecting portion of the heating chamber when the pump nozzle is connected to the projecting portion of the heating chamber during assembling.

4. The thermal energy storage system (1) according to claim 3, further comprising a sealing ring (24) for sealing said connecting interface (16), which sealing ring encircles a part of the nozzle (20) that is located outside of the heating chamber (6), wherein, during assembling of the pump arrangement (10) to the second container (8), the bellow (22) is configured to become pressed and deformed against the sealing ring.

5. The thermal energy storage system (1) according to claim 1, wherein the pump arrangement (10) has a predefined rotational orientation relative to the second container (8), wherein the system comprises guide elements (26) for guiding the pump arrangement such that when the pump arrangement is mounted into the second container it obtains said predefined rotational orientation.

6. The thermal energy storage system (1) according to claim 5, further comprising tightening elements (28) configured to cooperate with said guide elements (26) for fixating the pump arrangement (10) to the second container (8) when the pump arrangement has been inserted into the second container.

\* \* \* \* \*